United States Patent
Lee (10) Patent No.: US 9,176,561 B2
(45) Date of Patent: Nov. 3, 2015

(54) SMART BATTERY PACK SYSTEM CAPABLE OF PROVIDING POWER DURING ERRORS IN ITS FIRMWARE DATA

(75) Inventor: Soojin Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 236 days.

(21) Appl. No.: 13/475,619

(22) Filed: May 18, 2012

(65) Prior Publication Data

US 2012/0297211 A1 Nov. 22, 2012

(30) Foreign Application Priority Data

May 18, 2011 (KR) .......... 10-2011-0046827

(51) Int. Cl.
*G06F 1/32* (2006.01)
*G06F 9/445* (2006.01)

(52) U.S. Cl.
CPC ............ *G06F 1/3203* (2013.01); *G06F 8/65* (2013.01)

(58) Field of Classification Search
CPC ..... H01M 10/48; H02J 7/0047; H02J 7/0093; H02J 7/027; H02J 7/0029; G06F 11/0757; G06F 11/076; G05B 19/058; G05B 19/0428
USPC .......................... 713/320, 310, 300
See application file for complete search history.

(56) References Cited

U.S. PATENT DOCUMENTS

| | | | |
|---|---|---|---|
| 5,841,996 A | 11/1998 | Nolan et al. | |
| 6,005,367 A * | 12/1999 | Rohde .............. | 320/106 |
| 6,025,698 A | 2/2000 | Kim et al. | |
| 7,788,447 B2 * | 8/2010 | Deng et al. .......... | 711/115 |

(Continued)

FOREIGN PATENT DOCUMENTS

| | | |
|---|---|---|
| JP | 2001275270 | 10/2001 |
| JP | 2003173220 | 6/2003 |

(Continued)

OTHER PUBLICATIONS

Korean Notice of Allowance issued on Mar. 28, 2013 by KIPO in connection with Korean Patent Application No. 10-2011-0046827 and Request for Entry of the Accompanying Office Action attached herewith.

(Continued)

*Primary Examiner* — Thomas Lee
*Assistant Examiner* — Santosh R Poudel
(74) *Attorney, Agent, or Firm* — Robert E. Bushnell, Esq.

(57) ABSTRACT

A battery pack management system and method that can increase the stability of a product employing the battery pack by directly or indirectly correcting an error when the error is generated in a microprocessor of the battery pack. In the battery pack management system, the host device receives updated data of a predetermined program from the server through communication with the server and transmits the received updated data to the battery pack. The battery pack includes a battery cell, a charge/discharge control unit that controls charging and discharging of the battery cell, a microprocessor that incorporates a storage medium that records and stores the updated to data of the predetermined program transmitted from the host device, the microprocessor controls the charge/discharge control unit to be reset and applies the updated data of the predetermined program to the charge/discharge control unit to operate the charge/discharge control unit in a safety mode.

13 Claims, 8 Drawing Sheets

(56) References Cited

U.S. PATENT DOCUMENTS

| | | | |
|---|---|---|---|
| 7,852,045 B2 * | 12/2010 | Matsumura et al. | 320/134 |
| 7,924,631 B2 * | 4/2011 | Chiou | 365/189.05 |
| 8,249,666 B2 * | 8/2012 | Estevez et al. | 455/572 |
| 2003/0076072 A1 * | 4/2003 | Tojo et al. | 320/134 |
| 2003/0115001 A1 | 6/2003 | Odaohhara | |
| 2003/0138690 A1 * | 7/2003 | Matsui | 429/61 |
| 2003/0163640 A1 * | 8/2003 | Pruett et al. | 711/114 |
| 2004/0059867 A1 * | 3/2004 | Heinemann | 711/112 |
| 2004/0139357 A1 * | 7/2004 | Lee | 713/300 |
| 2005/0097542 A1 * | 5/2005 | Lee | 717/168 |
| 2007/0233750 A1 * | 10/2007 | Jhang et al. | 707/201 |
| 2008/0086652 A1 * | 4/2008 | Krieger et al. | 713/330 |
| 2008/0154691 A1 * | 6/2008 | Wellman et al. | 705/9 |
| 2008/0218918 A1 * | 9/2008 | De Koning et al. | 361/56 |
| 2008/0256526 A1 * | 10/2008 | Ellsworth et al. | 717/168 |
| 2008/0294938 A1 * | 11/2008 | Kondo | 714/24 |
| 2008/0295087 A1 * | 11/2008 | Kang et al. | 717/168 |
| 2010/0077390 A1 * | 3/2010 | Nicoulin et al. | 717/171 |
| 2010/0213891 A1 * | 8/2010 | Nishikawa et al. | 320/106 |
| 2010/0235822 A1 * | 9/2010 | Jamerson | 717/168 |
| 2011/0030029 A1 * | 2/2011 | Woo | 726/1 |
| 2011/0078435 A1 * | 3/2011 | Krieger et al. | 713/100 |
| 2011/0099544 A1 * | 4/2011 | Haramiishi et al. | 717/168 |
| 2011/0173604 A1 * | 7/2011 | Nakamura et al. | 717/173 |
| 2011/0239011 A1 * | 9/2011 | Waris et al. | 713/310 |
| 2011/0305926 A1 * | 12/2011 | Kim et al. | 429/7 |

FOREIGN PATENT DOCUMENTS

| | | |
|---|---|---|
| JP | 2009240055 | 10/2009 |
| JP | 2011083147 | 4/2011 |
| KR | 100234842 | 12/1999 |
| KR | 100262305 | 4/2000 |
| KR | 100709841 | 4/2007 |
| WO | 02067347 | 8/2002 |

OTHER PUBLICATIONS

Korean Office Action issued Sep. 17, 2012 in connection with Korean Patent Application Serial No. 10-2011-0046827 and Request for Entry of the Accompanying Office Action attached herewith.

* cited by examiner

SMART BATTERY PACK SYSTEM CAPABLE OF PROVIDING POWER DURING ERRORS IN ITS FIRMWARE DATA

CLAIM OF PRIORITY

This application makes reference to, incorporates into this specification the entire contents of, and claims all benefits accruing under 35 U.S.C. §119 from an application earlier filed in the Korean Intellectual Property Office filed on May 18, 2011 and there duly assigned Serial No. 10-2011-0046827.

BACKGROUND OF THE INVENTION

1. Field of the Invention

Embodiments of the present invention relate to a battery pack management system.

2. Description of the Related Art

In recent times, compact, slim and light-weight portable electric/electronic devices including cellular phones, notebook computers and camcorders are actively developed and produced. These devices have a battery pack to be operated in any places to which a power source is not provided. Examples of the battery pack include nickel-cadmium (Ni—Cd), nickel-metal hydride (Ni-MH) and lithium (Li) batteries, in an economical aspect, which are generally rechargeable secondary batteries.

The Li batteries have, in particular, been widely employed in the latest generation of electronics devices. A Li battery may have an operation voltage of 3.6V, which is about three times the operation voltage of comparable Ni—Cd or Ni—MH batteries. The Li battery may exhibit a relatively high energy density per unit weight.

The lithium ion battery has an unstable chemical composition, in an event of over-charge, over-discharge or over-current, there are high risks of performance deterioration, leakage, heat and smoke, fire or rupture. Thus, in order to protect the lithium ion battery from the risks, the lithium ion battery requires a protection circuit. The protection circuit necessarily performs the following functions. First, the protection circuit performs a charge/discharge controlling function for protecting the battery against over-charge, over-discharge, over-current, or over-heat. Second, the protection circuit performs a fuel gauging function for measuring voltage, current or temperature and integrating accumulated capacity. Third, the protection circuit communicates with a device set in a SMBus manner with regard to information on current, voltage and temperature.

The protection circuit is referred to as a smart circuit. Battery information is obtained from the smart circuit and is supplied to a host device.

In addition, the smart circuit, including a microprocessor, constitutes a battery management system. The microprocessor includes a firmware for driving the same and performs appropriate operations adapted to various situations using a data flash that is internally or externally stored.

However, when an error is generated in the firmware or data flash, serious problems, such as fire, rupture, heating or smoke, may occur to the battery, and product stability may be ruined. In addition, manufacturers are unavoidably forced to recall products in a large scale, and even more undesirably, there is no countermeasure to come up with such a massive product recall event.

SUMMARY OF THE INVENTION

Embodiments of the present invention provide a battery pack management system, which can increase the stability of a product employing the battery pack by directly or indirectly correcting an error when the error is generated at a microprocessor of the battery pack.

Embodiments of the present invention also provide a battery pack management system, which can obviate the need to recall a product employing a battery pack or to separately perform an error correction task when the error is generated at a microprocessor of the battery pack.

According to one aspect of the present invention, there is provided a battery pack management system that includes a server, an external set device including a battery pack and a host device, the host device including a storage medium that receives updated data of a predetermined program from the server via communication with the server and stores within the received data, the battery pack includes a battery cell, a charge/discharge control unit that controls charging and discharging of the battery cell, a microprocessor that controls driving of the charge/discharge control unit and a data communication unit that receives data of the predetermined program from the microprocessor, transmits the received data to the storage medium, or receives the updated data of the predetermined program from the storage medium and transmits the received updated data to the microprocessor, wherein the microprocessor controls the charge/discharge control unit to be reset and applies the updated data of the predetermined program to the charge/discharge control unit to operate the charge/discharge control unit in a safety mode. The data of the predetermined program includes at least one of product data of the microprocessor, and firmware version or data flash version data. The battery pack management system may also include an external update device arranged between the server and the host device to provide communication between the server and the host device, wherein the external update device encodes the data of the predetermined program and transmits the encoded data to the host device.

According to another aspect of the present invention, there is provided a battery pack management system that includes a server, an external set device including a battery pack and a host device, wherein the host device receives updated data of a predetermined program from the server through communication with the server and stores the received updated data, the battery pack includes a battery cell, a charge/discharge control unit that controls charging and discharging of the battery cell, a microprocessor that controls driving of the charge/discharge control unit, a first storage medium that receives the updated data of the predetermined program from the microprocessor, records and stores the received updated data and transmits the same to the microprocessor and a data communication unit that receives data of the predetermined program from the microprocessor, transmits the received data to the host device, or receives the updated data of the predetermined program from the host device and transmits the received updated data to the microprocessor, wherein the microprocessor controls the charge/discharge control unit to be reset and applies the updated data of the predetermined program to the charge/discharge control unit to operate the charge/discharge control unit in a safety mode. The microprocessor may include a second storage medium that stores the data of the predetermined program. The data of the predetermined program may include at least one of product data of the microprocessor, and firmware version or data flash version data.

According to yet another aspect of the present invention, there is provided a battery pack management system that includes a server, an external set device including a battery pack and a host device, wherein the host device includes a first storage medium to receive updated data of a predetermined program from the server via communication with the server and store within the received updated data from the server, the host to transmit the received updated data to the battery pack, the battery pack includes a battery cell, a charge/discharge control unit that controls charging and discharging of the battery cell, a microprocessor that controls driving of the charge/discharge control unit, a data communication unit that receives data of the predetermined program from the microprocessor, transmits the received data to the host device, or receives the updated data of the predetermined program from the host device and transmits the received updated data to the microprocessor and the first storage medium records and stores the updated data transmitted from the data communication unit, the microprocessor controlling the charge/discharge control unit to be reset and applies the updated data of the predetermined program to the charge/discharge control unit to operate the charge/discharge control unit in a safety mode. The microprocessor includes a second storage medium that stores the data of the predetermined program. The data of the predetermined program includes at least one of product data of the microprocessor, and firmware version or data flash version data.

According to still another aspect of the present invention, there is provided a battery pack management system that includes a server, an external set device including a battery pack and a host device, wherein the host device receives updated data of a predetermined program from the server via communication with the server and transmits the received updated data to the battery pack, the battery pack includes a battery cell, a charge/discharge control unit that controls charging and discharging of the battery cell, a microprocessor that includes a storage medium that records and stores the updated data of the predetermined program transmitted from the host device and controls driving of the charge/discharge control unit and a data communication unit that receives data of a predetermined program from the microprocessor and transmits the received data to the host device, or receives the updated data of the predetermined program from the host device and transmits the received updated data to the microprocessor, wherein the microprocessor controls the charge/discharge control unit to be reset and applies the updated data of the predetermined program to the charge/discharge control unit to operate the charge/discharge control unit in a safety mode. The data of the predetermined program includes at least one of product data of the microprocessor, and firmware version or data flash version data.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Throughout the specification, the same reference numerals refer to the same elements.

Figure 1:
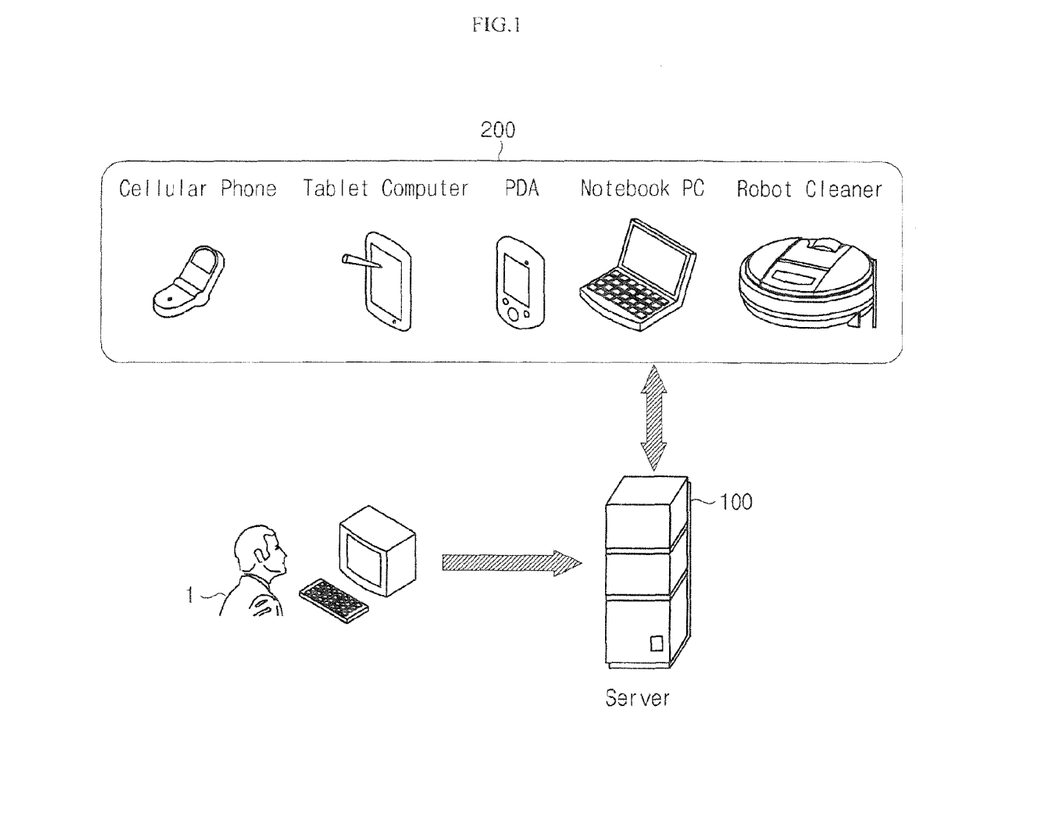
FIG. 1 illustrates an environment to which a battery pack management system according to an embodiment of the present invention is employed.

FIG. 1 illustrates an environment to which a battery pack management system according to an embodiment of the present invention is employed. FIG. 2A is a block diagram illustrating a state in which communication is established between the battery pack and the server in FIG. 1, and FIG. 2B is a block diagram illustrating a state in which communication is established between the battery pack and the server through an external update device, and FIG. 3 is a block diagram of a battery pack management system according to an embodiment of the present invention.

Figure 2:
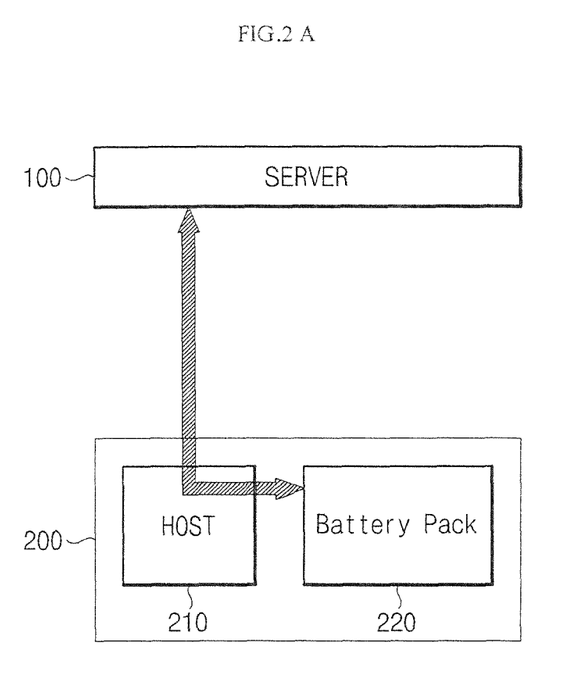
FIG. 2A is a block diagram illustrating a state in which communication is established between the battery pack and the server in FIG. 1.
FIG. 2B is a block diagram illustrating a state in which communication is established between the battery pack and the server through an external update device.
Figure 2B:
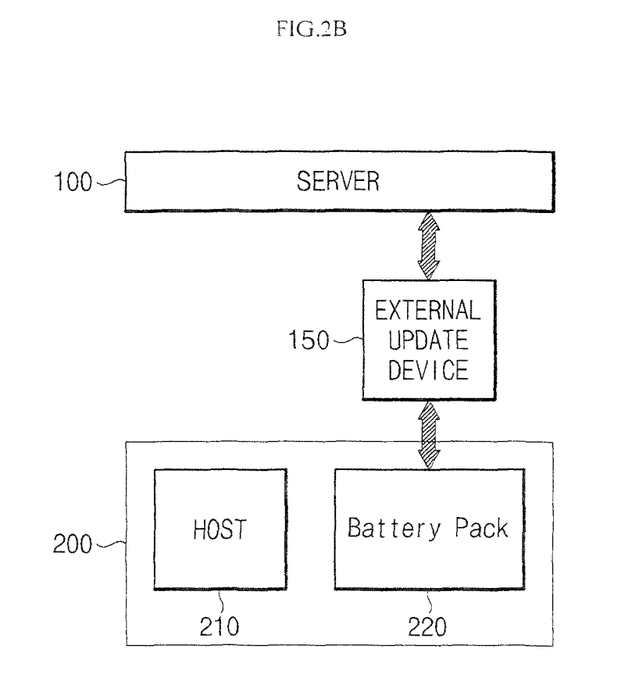
Figure 3:
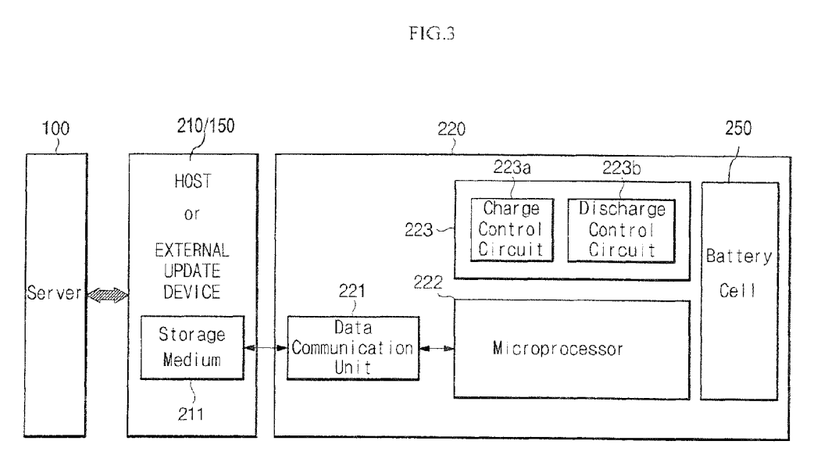
FIG. 3 is a block diagram of a battery pack management system according to a first embodiment of the present invention.

As shown in FIGS. 1 to 2B, in the battery pack management system according to an embodiment of the present invention, a battery pack 220 incorporating a smart circuit and a host device 210 are connected to an external server 100 in a wired/wireless manner such as a GPS or the Internet. Here, the battery pack 220 and the host device 210 are installed in an external set device 200, such as a cellular phone, a tablet computer, a personal digital assistant (PDA), a notebook computer, a robot cleaner, or the like. Here, the smart circuit transceives data through communication with the host device 210. With this configuration, the battery pack management system gets or updates information on the smart circuit. The smart circuit includes a microprocessor, a charge/discharge control unit, a data communication unit and a storage medium, which will later be described. In addition, the information on the smart circuit may include product data of the microprocessor and program data. Here, the program data of the microprocessor may include firmware version or data flash version data.

That is to say, when errors are generated in the product data and program data of the microprocessor, the battery pack management system updates the product data and program data of the microprocessor incorporated into the battery pack 220 through communication between the host device 210 and the external server 100. Here, the external set device 200 having errors is allowed to operate in a given mode (that is, a safety mode or a protection mode, to be referred to as 'safety mode' hereinafter), thereby allowing the external set device 200 to operate safely while the external set device 200 is being recalled (i.e., when the external set device 200 is in need of a newly released update).

In the battery pack management system, a smart circuit developer 1 may store latest version codes in the external server 100 and may periodically perform an operation of updating information on the external server 100 from the host device 210. For example, in a case of updating a Microsoft software function or correcting errors, if only the external set device 200 storing the latest version codes is connected to the Internet, Windows update may be automatically performed.

As shown in FIG. 3, the battery pack management system according to the first embodiment of the present invention includes an external server (SERVER) 100, a host device (HOST) 210 and a battery pack 220.

The external server 100 has latest firmware version data and/or latest data flash version data stored therein by the smart circuit developer 1. The external server 100 performs wired/wireless communication with the host device 210 or the external update device 150, which will later be described, and receives product data of the microprocessor 222 or firmware version data and/or data flash version data (to be referred to as data of a predetermined program hereinafter), or transmits latest product data to the microprocessor 222 or latest firmware version data and/or data flash version data (to be referred to as updated data of a predetermined program hereinafter).

The external set device 200 may be a device incorporating the host device 210 and the battery pack 220, and may include any device using a battery, such as a cellular phone, a tablet computer, a personal digital assistant (PDA), a notebook computer, a robot cleaner, or the like. The host device 210 includes a storage medium 211 that receives the updated data of the predetermined program through communication with the external server 100 and stores the received updated data. In addition, the host device 210 periodically accesses the external server 100 to receive the updated data of the predetermined program to apply the updated data to the charge/discharge control unit 223 through the microprocessor 222. The storage medium 211 may be incorporated into an external update device 150 disposed between the external server 100 or the host device 210 to establish communication therebetween. Here, the external update device 150 includes a device for encoding the updated data of the predetermined program and for transmitting the encrypted data to the host device 210. Alternatively, the host device 210 may instead include a device for decoding the encoded data and for transmitting the decoded data to the microprocessor 222. In any case, the host device 210 is connected to the external server 100 in a wired/wireless manner, such as a GPS or the Internet.

The battery pack 220 includes a charge/discharge control unit 223, a microprocessor 222, a data communication unit 221 and a battery cell 250. The charge/discharge control unit 223 controls charging and discharging of the battery cell 250 and includes a charge control circuit 223a and a discharge control circuit 223b. That is to say, the charge/discharge control unit 223 detects information regarding the present voltage, current or temperature of the battery cell 250, the remaining battery capacity calculated based on the information regarding the battery cell 250, information regarding battery abnormality, a usable time of the battery estimated based on the information regarding battery abnormality through the predetermined program executed by the microprocessor 222, a remaining charge time, information regarding a battery life, and so on, and transmits the detected information to the host device 210 through the microprocessor 222. In such a manner, the host device 210 may control charging and discharging of the battery cell 250 through the microprocessor 222.

The microprocessor 222 controls driving of the charge/discharge control unit 223. The microprocessor 222 may have firmware data and data flash that is stored internally or externally, thereby allowing the microprocessor 222 to perform appropriate operations adapted to various situations. The microprocessor 222 receives the updated data of the predetermined program through a data communication unit 221 to be later described, resets the charge/discharge control unit 223, and applies the updated data of the predetermined program to the charge/discharge control unit 223. Here, the microprocessor 222 controls the charge/discharge control unit 223 to operate the charge/discharge control unit 223 in a safety mode. Thus, the external set device 200 can be operated safely while the external set device 200 is being recalled.

The data communication unit 221 receives data of the predetermined program through the microprocessor 222 and transmits the same to the storage medium 211. In addition, the data communication unit 221 receives updated data of the predetermined program from the storage medium 211 and transmits the same to the microprocessor 222.

Figure 4:
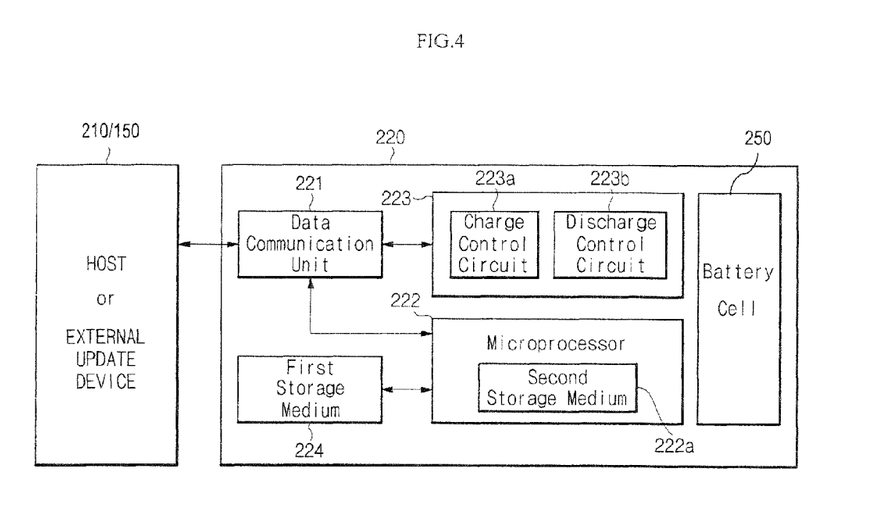
FIG. 4 is a block diagram of an external set device of a battery pack management system according to a second embodiment of the present invention.

Turning now to FIG. 4, FIG. 4 is a block diagram of an external set device of a battery pack management system according to a second embodiment of the present invention. As shown in FIG. 4, in the battery pack management system according to the second embodiment of the present invention, an external set device 200 stores updated data of a predetermined program in a first storage medium 224 within battery pack 220 while being connected to the outside of a microprocessor 222. This updated data from server 100 gets to first storage medium 224 by way of host 210, date communication unit 221 and microprocessor 222. That is to say, the first storage medium 224 directly transmits the updated data of the predetermined program stored therein to the microprocessor 222 to make the microprocessor 222 directly apply the updated data to a charge/discharge control unit 223.

Therefore, when the microprocessor 222 has determined that the predetermined program needs to be updated by a host device 210, the microprocessor 222 receives the updated data of the predetermined program directly from the first storage medium 224 and applies the received updated data to the charge/discharge control unit 223. Here, the microprocessor 222 controls the charge/discharge control unit 223 by operating the charge/discharge control unit 223 in a safety mode. In such a manner, the external set device 200 can be safely operated while the external set device 200 is being recalled.

Meanwhile, in the second embodiment of the present invention, the microprocessor 222 includes a second storage medium 222a incorporated therein to store data of the predetermined program.

Figure 5:
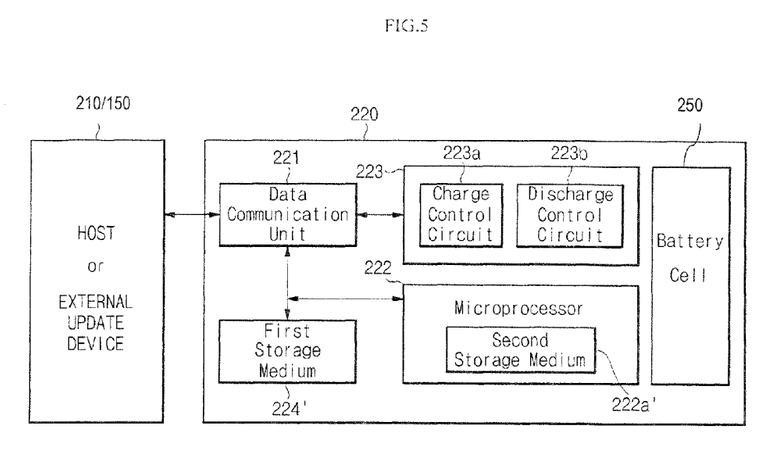
FIG. 5 is a block diagram of an external set device of a battery pack management system according to a third embodiment of the present invention.

Turning now to FIG. 5, FIG. 5 is a block diagram of an external set device of a battery pack management system according to a third embodiment of the present invention. As shown in FIG. 5, in the battery pack management system according to the third embodiment of the present invention, an external set device 200 stores updated data of a predetermined program in a first storage medium 224' connected to the outside of a microprocessor 222 while transmitting the updated data to the microprocessor 222 incorporated within a battery pack 220. That is to say, the microprocessor 222 directly applies the updated data transmitted through a data communication unit 221 to a charge/discharge control unit 223.

Therefore, when it is determined by a host device 210 that the predetermined program needs to be updated, the microprocessor 222 receives the updated data of the predetermined program through the data communication unit 221 and applies the received updated data to the charge/discharge control unit 223. Here, the microprocessor 222 controls the charge/discharge control unit 223 to be operated in a safety mode. In such a manner, the external set device 200 can be safely operated while the external set device 200 is being recalled.

Meanwhile, in the third embodiment of FIG. 5, the microprocessor 222 has a second storage medium 222a' incorporated therein to store data of the predetermined program.

Figure 6:
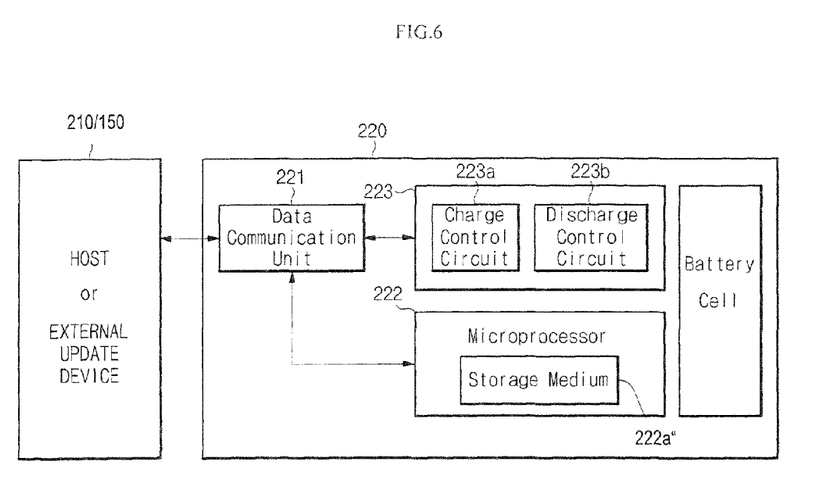
FIG. 6 is a block diagram of an external set device of a battery pack management system according to a fourth embodiment of the present invention.

Turning now to FIG. 6, FIG. 6 is a block diagram of an external set device of a battery pack management system according to a fourth embodiment of the present invention. As shown in FIG. 6, in the battery pack management system according to the fourth embodiment of the present invention, an external set device 200 stores updated data of a predetermined program in a storage medium 222a" incorporated within the microprocessor 222. That is to say, the microprocessor 222 stores the updated data of the predetermined program transmitted through a data communication unit 221 within the storage medium 222a", and directly applies data of the predetermined program stored within the storage medium 222a" to a charge/discharge control unit 223.

Therefore, when it is determined by a host device 210 that the predetermined program needs to be updated, the microprocessor 222 receives the updated data of the predetermined program stored in the storage medium 222a" and applies the received updated data to the charge/discharge control unit 223. Here, the microprocessor 222 controls the charge/discharge control unit 223 so that the charge/discharge control unit 223 can be operated in a safety mode. In such a manner, the external set device 200 can be safely operated while the external set device 200 is being recalled.

Figure 7:
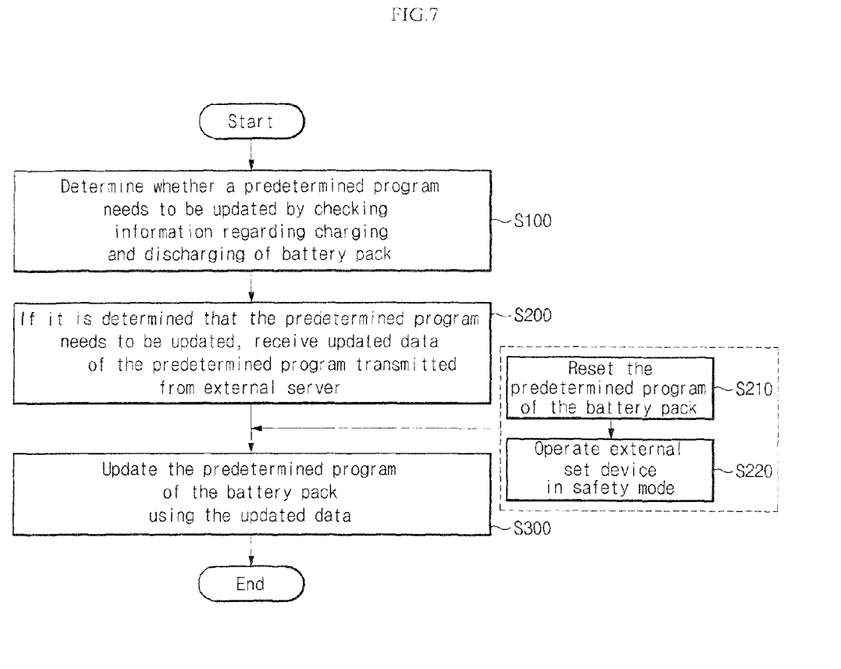
FIG. 7 is flowchart showing a battery pack management method using a battery pack management system according to an embodiment of the present invention.

Turning now to FIG. 7, FIG. 7 is flowchart showing a battery pack management method using a battery pack management system according to an embodiment of the present invention. As shown in FIG. 7, the battery pack management method using the battery pack management system according to the present invention includes determining whether a predetermined program needs to be updated by checking information regarding charging and discharging of a battery pack management system (S100), if it is determined that the predetermined program needs to be updated, receiving updated data of the predetermined program transmitted from the external server (S200), and updating the predetermined program of the battery pack using the updated data of the predetermined program (S300).

In addition, after the step S200, the battery pack management method further includes resetting the predetermined program of the battery pack (S210) and operating the battery pack in a safety mode (S220). Then, phrases saying that the battery needs to be replaced may be indicated on an external display. Alternatively, the battery pack may be controlled not to be used.

Therefore, according to the present invention, when an error is generated in a microprocessor of a battery pack, the error can be directly or indirectly corrected in a host device, thereby increasing the stability of a product employing the battery pack. In addition, since it is not necessary to recall a product employing the battery pack or to separately perform error correction, the reliability of the product employing the battery pack can be improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack management system, comprising:
a server;
an external set device including a battery pack and a host device, the host device including a storage medium that receives updated data of a predetermined program from the server via communication with the server and stores within the received updated data, the battery pack comprises:
a battery cell;
a charge/discharge control unit that controls charging and discharging of the battery cell;
a microprocessor that controls driving of the charge/discharge control unit; and
a data communication unit that receives the updated data of the predetermined program from the storage medium and transmits the received updated data to the microprocessor,
wherein upon errors being generated in product data and program data of the microprocessor, the microprocessor resets the charge/discharge control unit and applies the updated data of the predetermined program to the charge/discharge control unit while operating the charge/discharge control unit in a safety mode to safely operate the external set device until the charge/discharge control unit is updated with the received updated data of the predetermined program.

2. The battery pack management system of claim 1, wherein the data of the predetermined program includes at least one of product data of the microprocessor, and firmware version or data flash version data.

3. The battery pack management system of claim 1, further comprising an external update device arranged between the server and the host device to provide communication between the server and the host device, wherein the external update device encodes the data of the predetermined program and transmits the encoded data to the host device.

4. A battery pack management system, comprising:
a server;
an external set device including a battery pack and a host device, wherein the host device receives updated data of a predetermined program from the server through communication with the server and stores the received updated data, the battery pack comprises:
a battery cell;
a charge/discharge control unit that controls charging and discharging of the battery cell;
a microprocessor that controls driving of the charge/discharge control unit;
a first storage medium external to the microprocessor that receives the updated data of the predetermined program from the microprocessor, records and stores the received updated data and transmits the updated data of the predetermined program to the microprocessor; and
a data communication unit that receives the updated data of the predetermined program from the host device and transmits the received updated data to the microprocessor,
wherein upon errors being generated in product data and program data of the microprocessor, the microprocessor resets the charge/discharge control unit and applies the updated data of the predetermined program to the charge/discharge control unit while operating the charge/discharge control unit in a safety mode to safely operate the external set device until the charge/discharge control unit is updated with the received updated data of the predetermined program.

5. The battery pack management system of claim 4, wherein the microprocessor comprises a second storage medium that stores the data of the predetermined program.

6. The battery pack management system of claim 4, wherein the data of the predetermined program includes at least one of product data of the microprocessor, and firmware version or data flash version data.

7. The battery pack management system of claim 4, the first storage medium being only connected to the microprocessor.

8. The battery pack management system of claim 4, updated data of the predetermined program from the server gets to the first storage medium by way of the host, the data communication unit and the microprocessor.

9. A battery pack management system, comprising:
a server;
an external set device including a battery pack and a host device, wherein the host device includes a first storage medium to receive updated data of a predetermined program from the server via communication with the server and store within the received updated data from the server, the host to transmit the received updated data to the battery pack, the battery pack comprises:
a battery cell;
a charge/discharge control unit that controls charging and discharging of the battery cell;
a microprocessor that controls driving of the charge/discharge control unit;
a data communication unit that receives the updated data of the predetermined program from the host device and transmits the received updated data to the microprocessor; and
the first storage medium records and stores the updated data transmitted from the data communication unit, wherein upon errors being generated in product data and program data of the microprocessor, the microprocessor resets the charge/discharge control unit and applies the updated data of the predetermined program to the charge/discharge control unit while operating the charge/discharge control unit in a safety mode to safely operate the external set device while and until the charge/discharge control unit is updated with the received updated data of the predetermined program.

10. The battery pack management system of claim 9, wherein the microprocessor comprises a second storage medium that stores the data of the predetermined program.

11. The battery pack management system of claim 9, wherein the data of the predetermined program includes at least one of product data of the microprocessor, and firmware version or data flash version data.

12. A battery pack management system, comprising:
a server;
an external set device including a battery pack and a host device, wherein the host device receives updated data of a predetermined program from the server via communication with the server and transmits the received updated data to the battery pack, the battery pack comprises:
a battery cell;
a charge/discharge control unit that controls charging and discharging of the battery cell;
a microprocessor that includes a storage medium that records and stores the updated data of the predetermined program transmitted from the host device and controls driving of the charge/discharge control unit; and
a data communication unit that receives the updated data of the predetermined program from the host device and transmits the received updated data to the microprocessor,
wherein upon errors being generated in product data and program data of the microprocessor, the microprocessor resets the charge/discharge control unit and applies the updated data of the predetermined program to the charge/discharge control unit while operating the charge/discharge control unit in a safety mode to safely operate the external set device while the charge/discharge control unit is being updated with the received updated data of the predetermined program, the safety mode to be run while the external set device is waiting for an update.

13. The battery pack management system of claim 12, wherein the data of the predetermined program includes at least one of product data of the microprocessor, and firmware version or data flash version data.

* * * * *